March 10, 1964 E. BUEHLER ETAL 3,124,455

FABRICATION OF $Nb_3Sn$ SUPERCONDUCTING ELEMENT

Filed Jan. 9, 1961 2 Sheets-Sheet 1

INVENTORS E. BUEHLER
J. E. KUNZLER

BY George S. Indig

ATTORNEY

INVENTORS E. BUEHLER
J. E. KUNZLER
BY
George S. Indig
ATTORNEY 3,124,455

FABRICATION OF $Nb_3Sn$ SUPERCONDUCTING ELEMENT

Ernest Buehler, Chatham Township, Morris County, and John E. Kunzler, Washington, N.J., assignors to Bell Telephone Laboratories, Incorporated, New York, N.Y., a corporation of New York Filed Jan. 9, 1961, Ser. No. 81,400
18 Claims. (Cl. 75—214)

Figure 1A:
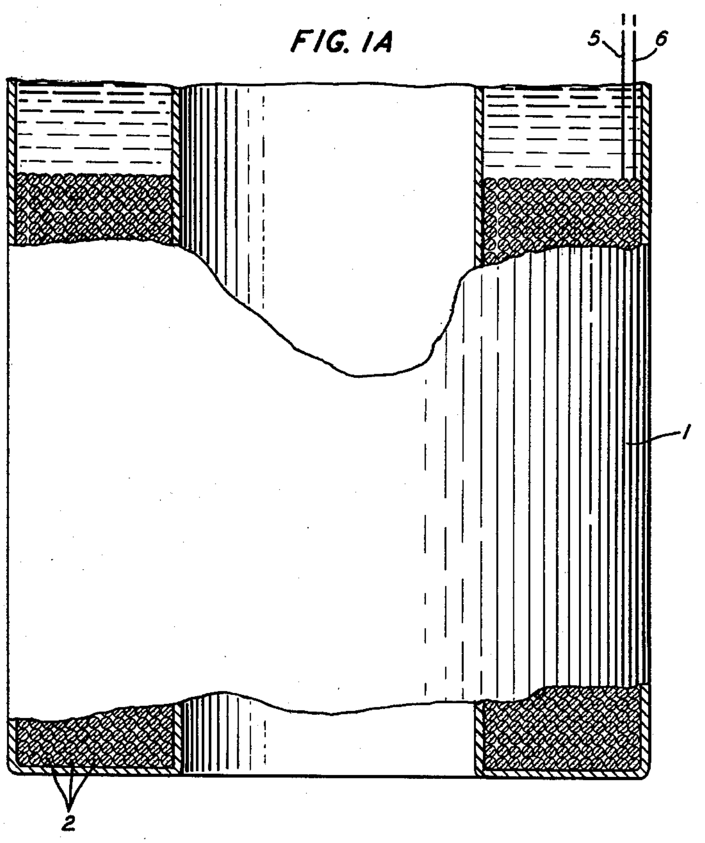

This invention relates to methods of making superconducting elements and particularly those in which the active superconducting medium includes $Nb_3Sn$ as well as to articles so produced.

Although the phenomenon of superconductivity has been recognized for some years, and although it has been observed in a wide range of materials, useful devices based on this mechanism have been slow in developing. Although much of the delay can be attributed to practical considerations, such as the difficulty of attaining the necessary low temperatures, material limitations have played an important part. Most contemplated uses of superconducting elements require the flow of fairly large currents, and many are dependent upon the creation of a magnetic field of some magnitude.

It is known that the effectiveness of a given material in such a use is limited, inter alia, by parameters which have come to be designated as critical current and critical field. These values, which are interrelated, are defined as the maximum current and field values which can be tolerated by the medium in its superconducting state. Exceeding either maximum results in the breakdown of the material into its normal state and results in a finite resistance. The two quantities are interrelated, the highest value of critical field corresponding with zero critical current and the highest value of critical current corresponding with the lowest value of critical field.

Additionally, most contemplated devices utilizing a superconducting element involve one or more wire configurations. Such configurations may take the form of single or multiple straight strands, or for many magnetic applications may assume the form of one or more coils, as in an ordinary solenoid.

Unfortunately, it has been the general experience of workers in the art that superconducting materials having the requisite physical properties for permitting such operations as drawing, winding, and the like are limited by very low values of critical field and/or critical current, while materials apparently possessing appropriate superconducting properties are extremely brittle and unworkable by ordinary fabricating techniques.

Some years ago it was suggested by B. T. Matthias and others of Bell Telephone Laboratories, 95 Physical Review, 1345 (1954), that a compound of niobium and tin, $Nb_3Sn$, showed promise of having particularly good superconducting properties. This suggestion was based both on theoretical considerations and on the high value of critical temperature measured at about 18° K. During the years following the suggestion, various people have become interested in $Nb_3Sn$ only to find that its extreme brittleness made the fabrication of devices unfeasible.

In accordance with the present invention, there is described a technique for producing wire-like configurations of $Nb_3Sn$. These configurations, suitable for the windings of magnets, are produced by a succession of cold-reducing steps applied to metallic tubes filled either with powdered $Nb_3Sn$ or with the reactants niobium and tin, by forming the reduced filled tubes to the desired configuration and by heat treating under specified time and temperature conditions to produce a continuous phase of the superconducting compound. Aside from filling the obvious need of providing a means for fabricating the wire-like configurations of this brittle superconductor, an unforeseen advantage is gained by the described procedures. As is described at some length herein, the already excellent $Nb_3Sn$, capable of sustaining current densities as high as 4000 amperes/cm.$^2$ at fields of the order of 88 kgauss, is after processing, in accordance with preferred methods of this invention, found to be capable of sustaining still higher current densities. In fact, average current densities of the order of 100,000 amperes/cm.$^2$ have been observed in an 88 kgauss field. This field is several times greater than anything previously reported in the literature.

Figure 1B:
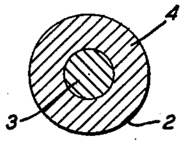
Figure 3:
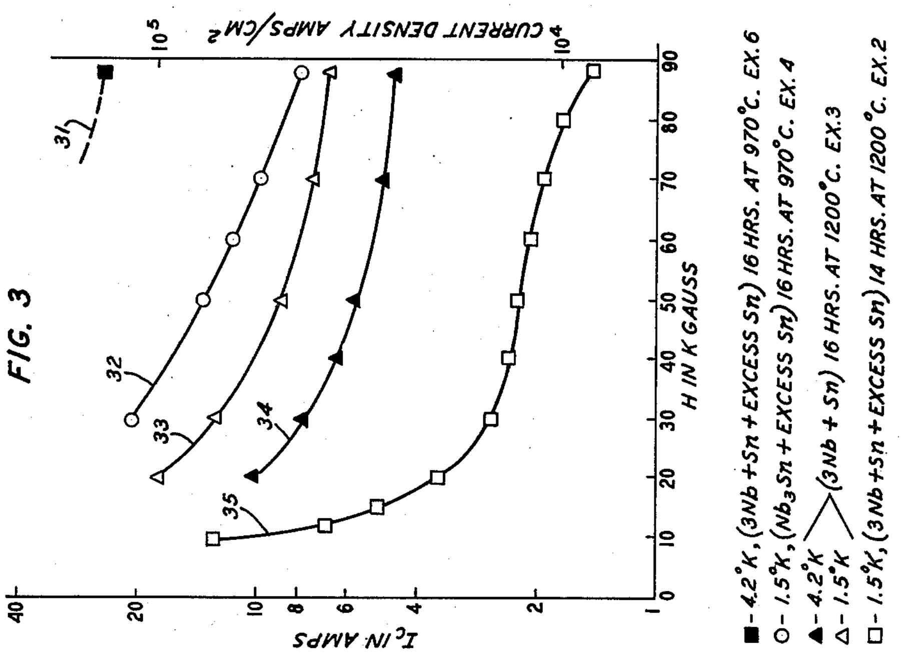
Figure 2:
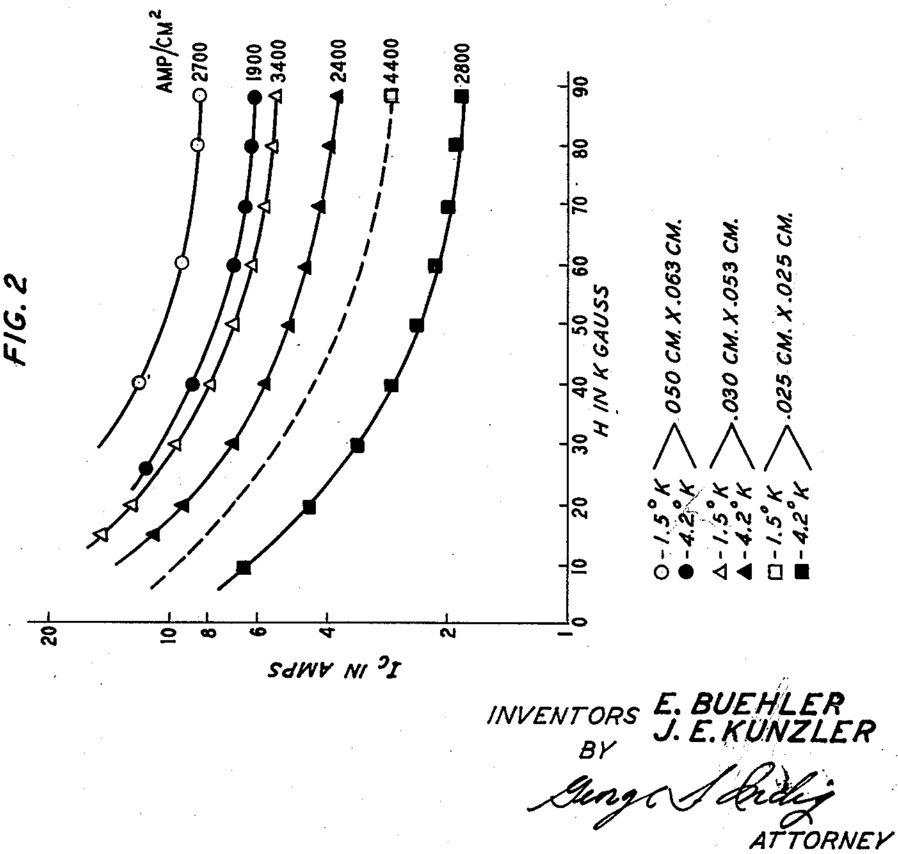

An understanding of the invention is facilitated by reference to the drawing in which:

FIG. 1*a* is a sectional view of a magnet configuration consisting of an annular cryostat containing several windings of $Nb_3Sn$ prepared in accordance with this invention;

FIG. 1*b* is a cross sectional view of a single turn of a winding shown in FIG. 1*a*;

FIG. 2, on coordinates of critical current in amperes and magnetic field in kgauss, is a plot showing the relationship between critical current and critical field for three different bulk samples of $Nb_3Sn$; and FIG. 3, on the same coordinates, is a plot showing the relationship between the same values for $Nb_3Sn$ wire configurations prepared in accordance with this invention under various processing conditions.

Referring more specifically to FIG. 1*a*, there is shown an annular cryostat 1 of the approximate dimensions 18 inches O.D. by 6 inches I.D. by 30 inches long filled with liquid helium and containing 3000 turns per centimeter length of $Nb_3Sn$ windings 2. Terminal leads 5 and 6 are shown emerging from the coil. A pumping means, not shown, is attached to the cryostat so as to permit a temperature variation corresponding with the variation in boiling point for different pressures. The pumping means used in the experimental work described herein permits regulation of temperature between the values of 1.5° K. and 4.2° K., corresponding with a pressure range of 3.6 millimeters of mercury and atmospheric pressure.

FIG. 1*b* is an enlarged cross sectional view of a single turn 2 of $Nb_3Sn$ shown in FIG. 1*a*. It is seen that the inner core 3 of $Nb_3Sn$, here of a diameter of the order of 6 mils, is encased within sheathing 4, for example of niobium. The entire configuration, including sheathing 4, has an outside diameter of the order of 15 mils.

As is described, the experimental work resulting in the measured values reported herein, made use of a direct-current supply source in series with one or more variable resistors. By this means it was possible to vary the current flowing through the superconducting specimen, and by also adjusting the applied field to so determine the relationship between critical current and critical field. In actual operation, a solenoid structure such as that shown in FIGS. 1*a* and 1*b* may avoid resistance losses and so obviate the need for a continuous direct-current source by using an arrangement for shunting the current. Such arrangements are considered well known in the art, conventional circuits as well as certain novel arrangements all usable in conjunction with the instant invention being described at some length in copending U.S. application Serial No. 56,748, filed September 19, 1960 (J. E. Kunzler Case 1). Each of the two techniques has its advantages. Where the magnetic field is to be varied during operation, it is necessary to use a continuous direct-current source together with a variable resistor or other adjusting means. Where the requirement is for a constant field, optimum efficiency is attained by use of a shunt. Where extremely high current densities are to be used, it may be unfeasible to use a continuous direct-current source and other exposed circuitry by reason of the large heat losses.

The values set forth on FIG. 2 correspond with bulk samples of rectangular cross section. The material upon which measurements were made was pure, dense $Nb_3Sn$, each specimen having a length of about 2 centimeters and varying in thickness from 0.025 centimeter to 0.063 centimeter, as indicated. These samples were cut from an ingot which was prepared by first sintering a stoichiometric mixture of tin and niobium powders at 1800° C. and then melting the compact in a zirconia crucible in an argon atmosphere at about 2400° C. The original data was tabulated and plotted with a view to determining the effect of the critical parameters on the samples. For ease of comparison with the drawn samples for which the same parameters are plotted on FIG. 3, the value of critical current density in amperes/$cm.^2$ is indicated for a point on each curve corresponding with a field value of 88 kgauss.

In addition to the high magnetic fields and current densities for which superconductivity exists in $Nb_3Sn$, there are two other interesting features of the data of FIG. 2. First, although the relationship is not ideal, the average current density scales more nearly as the perimeter of the cross section than its area, indicating at least some of the properties of a "soft" superconductor (that is, one in which current flow is largely through the skin). However, the deviation from this relationship does indicate that some current is being carried by a different mechanism associated with "hard" superconductors and sometimes postulated as filamentary flow. Another deviation from current theory is observed. Although the critical temperature $T_c$ is about 18° K. for $Nb_3Sn$, the "critical field" increases more than 50 percent between 4.2° K. and 1.5° K. The deviation from the predicted variation based on the generally observed parabolic behavior is appreciable.

The samples for which data is plotted on FIG. 3 were prepared in accordance with the inventive methods herein. These particular specimens were produced by packing 0.6 centimeter O.D. by 0.3 centimeter I.D. niobium tubes either with a mechanical mixture of powders of $Nb_3Sn$ together with a 10 weight percent excess of powdered tin (curve 32) or with mixtures of unreacted tin and niobium powders (curves 31, 33, 34, 35). One of the samples (curves 33, 34) prepared from the unreacted powders contained a stoichiometric mixture, while the other (curves 31, 35) additionally contained a 10 weight percent excess of tin. For each of the specimens plotted, the tubes, once filled, were closed with niobium plugs and were mechanically reduced in size to 0.04 centimeter O.D. and approximately 0.015 centimeter I.D. Each of the tubular samples was heated to a prescribed temperature as indicated in the range of 970° C. to 1200° C. for periods of about 16 hours. The detailed preparation is set forth in the examples. For convenience, example numbers are indicated after each notation in the key. For ease of comparison with FIG. 2, a current density scale is included on the right-hand side of the figure.

An inventive aspect of the procedures herein is reflected in the values of average current densities realized in the mechanically reduced samples of FIG. 3 as compared with the corresponding values for the cast samples of FIG. 2. It is seen that all of the curves of FIG. 3 represent significantly higher current densities. In fact, the highest value shown, that of the single point plotted with a closed square, represents an average current density about 50 times higher than the corresponding data of FIG. 2, this indicated value exceeding 100,000 amperes/$cm.^2$. It has been established that the niobium tube material does not contribute to the indicated terminal values at 88 kgauss, it being found that this material is in the normal state in fields above 20 kgauss. In fact, the contribution of niobium sheathing material for low fields is seen in the first values plotted on curve 35 of FIG. 3.

Certain additional conclusions may be drawn from the plotted data of FIG. 3. All conclusions are confirmed by additional data not plotted. A comparison of curve 33 with curve 35 suggests that stoichiometric mixtures of unreacted niobium and tin powders is preferable to such mixtures with an excess of tin. A comparison of these curves with curves 31 and 32 indicates that it is preferable to start with the elemental powders with or without an excess of tin rather than with powdered $Nb_3Sn$ with excess tin powder under the indicated conditions. Further data discussed in conjunction with the examples indicates that a tin excess is necessary where the powdered compound $NB_3Sn$ is used. In this connection it is evident that the tin excess serves the function of improving sintering over the temperature range utilized. The general effects of temperature and time are discussed further on.

The following is a general description of the procedure followed in preparing and testing the samples of Examples 1 through 12.

GENERAL PROCEDURE FOR PREPARING MECHANICALLY REDUCED TUBE

A high purity niobium tube (99.8% electron-beam melted) of dimensions ⅛" I.D. by ¼" O.D. by 2¼" long was plugged at one end with a niobium plug of the same purity and was filled with one of the following three powder mixes:

(1) Mix A—$Nb_3Sn$ plus 10 weight percent tin, based on the amount of powdered compound.

(2) Mix B—Unreacted elemental niobium plus tin including a 10 weight percent excess of tin over stoichiometry based on total stoichiometric amounts.

(3) Mix C—A stoichiometric mixture of unreacted powders of niobium and tin.

The powders were of the following grade and average particle size:

| | Purity, percent | Average Particle Size, mesh |
|---|---|---|
| $Nb_3Sn$ | 99.7 | 100–400 |
| Nb | 99.6 | 325 |
| Sn | 99.9 | 325 |

The tube was filled and compacted by repeatedly filling and tamping with a closely fitting rod and was finally plugged at the open end again with a niobium plug of the same material.

The filled tube was swaged on Langelier Model 3A swager without external application of heat to dimensions of 0.030" I.D. by 0.065" O.D. unless otherwise noted, following which it was cold reduced by successive drawing through several dies to the final indicated dimensions. At this stage, the tube was of the order of fifty feet in length. Each tube was then cut up into several portions of the order of 3 inches in length, and one or more portions were heat treated at a temperature and for a time indicated in the examples. Heat treatment was carried out in a vacuum of the order of $10^{-6}$ mm. of mercury.

A sample about ⅞" in length was cut from the center region of a heat treated length. Copper current leads were attached to the ends and copper potential leads were attached approximately ¼" from the ends, so as to be spaced by about ⅜". The sample was then placed in a cryostat containing liquid helium positioned within a solenoid in such manner that the major axis of the sample was normal to the axis of the core of the solenoid. Leads were brought out of the cryostat. Current leads were connected to a 6 volt D.-C. source through a variable resistance. Voltage leads were connected to the input of a Liston-Becker D.-C. amplifier, the output of which was fed to a Leeds and Northrup Type H Speedomax Recorder.

Two reference temperatures were available in the cryostat and measurements were made at one or the other or both, as indicated. The first temperature of 4.2° K. corresponds with the boiling point of liquid helium under atmospheric pressure. The second point, of 1.5° K., was achieved by maintaining a vacuum of the order of 3.6 mm. of mercury over the helium surface. Critical currents for various values of critical field were determined by selecting a desired field value and increasing the current passing through the samples by adjusting the variable resistance until a measurable potential drop of the order of a few hundredths of 1 microvolt was observed. The solenoid and circuitry involved limited measurements to a maximum field of 88 kgauss and maximum current of slightly under 25 amperes. Where the full range of critical currents was measurable, this value was determined for of the order of ten different values of critical field.

In the interest of brevity, critical currents only for the one value of critical field of 88 kgauss are set forth. Where measurements were made at 1.5° K. and 4.2° K. both, both such values are indicated. Representative curve forms are set forth in FIG. 3. Correspondence between such curves and the examples is noted in the key of that figure. Substantial deviations from these representative forms were not observed.

*Example 1*

The sample was prepared as indicated under the general procedure outlined above utilizing powder mix A. The final dimensions of the sample were 6 mil I.D. by 15 mil O.D. Heat treatment was carried out for 16 hours at 1200° C. Critical currents at 88 kgauss were 5.7 amperes at 1.5° K. and 1.5 amperes at 4.2° K.

*Example 2*

The tube was packed with powder mix B. The final dimensions were as set forth in Example 1. Heat treatment was for 14 hours at 1200° C. Critical current was 1.5 amperes measured at 1.5° K.

*Example 3*

The tube was filled with mix C. Final dimensions were as set forth in Example 1. Heat treatment was for 16 hours at 1200° C. Measured values of critical current were 6.7 amperes at 1.5° K. and 4.6 amperes at 4.2° K.

*Example 4*

The tube was filled with powder mix A, was reduced to the final dimensions indicated in Example 1, and was heat treated for 16 hours at a temperature of 970° C. A critical current of 7.8 amperes was measured at 1.5° K.

*Example 5*

The tube was filled with powder mix A, was reduced to the final dimensions indicated in Example 1, and was heat treated for 18 hours at 1400° C. A critical current of 1.5 amperes was measured at 1.5° K.

*Example 6*

The tube was filled with powder mix B, was reduced to the final dimensions indicated in Example 1, and was heat treated for 16 hours at 970° C. Critical current: 23.5 amperes at 1.5° K.

*Example 7*

The tube was filled with powder mix A, was reduced to the final dimensions indicated in Example 1, and was heat treated for 5 hours at 1200° C. Critical current: 1.6 amperes at 1.5° K.

*Example 8*

Powder mix A:

- Final dimensions as indicated in Example 1.
- Heat treatment for 25 hours at 1200° C.
- Critical current: 3.5 amperes at 1.5° K.

Examples 9 and 10 correspond with runs made to determine the effect of the degree of reduction and utilize a niobium tube of initial dimensions 25 mils I.D. by 52 mils O.D. in lieu of that set forth in the general procedure above.

*Example 9*

Powder mix A:

- Dimensions after swaging 7 mils I.D. by 17 mils O.D.
- Heat treatment 16 hours at 1200° C.
- Critical current: 2.7 amperes at 1.5° K. (Scaling this to the 6 mil I.D. of Examples 1–8 based on volume ratios indicates a corrected value of about 2 amperes.)

*Example 10*

Powder mix A:

- Dimensions after swaging 15 mils I.D. by 33 mils O.D.
- Heat treatment 16 hours at 1200° C.
- Observed critical current: 2.5 amperes at 1.5° K. and 1.9 amperes at 4.2° K. (Scaling this by area to the dimensions of Examples 1–9 results in calculated values of about 0.6 and 0.5 ampere at 1.5° K. and 4.2° K., respectively.)

*Example 11*

Powder mix A:

- Dimensions after swaging 30 mils I.D. by 65 mils O.D.
- Final dimensions 12 mil I.D. by 30 mil O.D.
- Heat treatment 20 hours at 1200° C.
- Critical current at 1.5° K. in excess of 25 amperes. Corrected on the basis of area ratio to greater than 6 amperes.

*Example 12*

Powder mix B:

- Dimensions both after swaging and after drawing as indicated in Example 11.
- Heat treatment 20 hours at 1200° C.
- Critical current in excess of 25 amperes at 1.5° K.
- Corrected to greater than 6 amperes for 6 mil I.D.

Examples 13 and 14 correspond with experimental runs made with a view to determining the effect of mechanical reduction. In both of these examples the powdered mixes indicated were carefully inserted into and compacted within the already reduced niobium tube. The reduced dimensions of the unfilled tube were 25 mil I.D. by 95 mil O.D. Since there is no reduction of a filled member, both examples define conditions outside of the scope of the preferred embodiments of the invention.

*Example 13*

Powder mix A:

- Heat treatment 18 hours at 1200° C.
- Observed critical currents 0.9 ampere at 1.5° K., 0.6 ampere at 4.2° K. Correcting on the basis of volume to the 6 mil I.D. of Examples 1–8 results in calculated values of 0.06 and 0.04 ampere at 1.5° K. and 4.2° K., respectively.

*Example 14*

Powder mix B:

- Heat treatment 18 hours at 1200° C.
- Measured critical current 0.8 ampere at 1.5° K. corrected to 0.05 ampere for a 6 mil I.D.

Recommended processing conditions are discussed in view of FIGS. 2 and 3 and Examples 1–14. From a comparison of Examples 1–8, 11, and 12 with Examples 13 and 14, particularly in view of Examples 9 and 10, it is seen that permissible current density at a given field value is dependent upon the degree of mechanical working. From a comparison of Examples 11 and 12 with 1–8, it is seen that working has effected a change in the nature of the superconductor itself. Whereas the critical current for the bulk samples for which data is plotted on FIG. 2 scales between perimeter and cross section area, so indicating at least some of the properties of a "soft" superconductor, the worked samples manifest critical currents which scale as the area, so indicating "hard" superconducting properties generally associated with filamentary flow. This "hardening" of the superconductor is, however, not easily associated with the degree of working per se. It is evident that such working would have a more marked effect on powder mix A, where the $NB_3Sn$ compound is already present than on the elemental powders, in which latter instance it is difficult to conceive of any degree of working being carried over to the inchoate compound. That the compacting resulting from reduction is beneficial is unquestioned. That it does not serve to explain the advantages realized must be concluded by comparison with currents realized in the bulk samples prepared from the melt. Accordingly, although a complete theoretical explanation cannot be postulated, it is clear that the advantages here realized are a result of reduction of a filled member. Since the current densities realized in Examples 9 and 10 are only slightly better than those realized in the bulk material, it is considered that this degree of working represents a preferred minimum for the purposes of this aspect of the invention. This degree of working is represented as 60 percent on the usual metallurgical basis.

$$\left(\frac{\text{Original cross sectional area} - \text{final cross sectional area}}{\text{Original cross sectional area}} \times 100\%\right)$$

From the reported data of the examples it is clear that there is no maximum. However, from a comparison of Examples 11 and 12 with Examples 1 and 2, discounting for the moment the slightly different heat treatment time, it is seen that no appreciable advantage was realized by further reduction from the 12 mil I.D. wire of Examples 11 and 12 to the 6 mil I.D. wire of Examples 1 and 2. Examples 11 and 12 may be considered as representing 99 percent reduction. On the same basis, Examples 1 and 2 represent 99.7 percent reduction. It is apparent, then, that optimum (or maximum effective) reduction is of the order of about 99 percent.

The effect of variations in temperature of heat treatment are seen from a comparison of Examples 1, 4 and 5 for powder Mix A and 2 and 6 for powder mix B. In each instance it is seen that current density increases with a decrease in temperature, this effect, however, being considerably more pronounced for powder mix B. The reaction of the elemental materials niobium and tin to form $Nb_3Sn$ is exothermic at a temperature of approximately 800° C. Under the conditions that obtain with the compacted elemental powders initial reaction may occur as low as 500° C. However, since the reaction is exothermic, the heat treatment actually proceeds well above this temperature. This is considered to be the minimum temperature for heat treatment. From the standpoint of the powders themselves, the maximum heat treatment temperature is of the order of 1500° C., since it is indicated that temperatures substantially above this value for the times indicated result in critical currents only comparable with those of the bulk material. Although niobium tubing is capable of withstanding even higher temperatures, up to the order of 2400° C., and by its nature can produce no deleterious reaction with the tube contents, use of other sheathing materials may dictate a lower preferred maximum temperature. For example, where stainless steel tubing is used, it has been found desirable to operate at temperatures below about 1200° C. A still more preferred general temperature range is therefore from about 800° C. to 1200° C., with an indicated optimum below the midpoint of this range at between 900 and 1000° C.

The effect of variations in time of heat treatment is seen from a comparison of Examples 1, 7 and 8. It is seen that for the firing temperature there used, 1200° C., an optimum in critical current was realized for a 16 hour heat treatment with the value falling off to 3.5 amperes at 25 hours and still more sharply to 1.6 amperes for a 5 hour treatment. Both terminal values, however, represent a marked improvement over the bulk material. Although it is true here, in common with other powder metallurgical processes, that there are equivalent products of time and temperature, with time decreasing for increasing temperature, a second effect is seen. It is apparent that extremely long firing times are to be avoided for any temperature. Such times in excess of values of the order of 50 hours result in a reduction of critical current values eventually approaching values commensurate with those of the bulk material, due possibly to a second order reaction. A minimum time for heat treatment at 1200° C. of about 2 hours is indicated. Although it is clear that equivalent reaction may be brought about for shorter times at higher temperatures, it is not recommended that this minimum be exceeded, since shorter periods apparently do not afford the time necessary to bring about the single phase formation necessary for current flow. The preferred heat treatment time is in the range of from 5 hours to about 25 hours, with an indicated optimum at from about 12–20 hours.

With regard to the tin excess, it is seen from a comparison of Examples 2 and 3 that excess tin is unnecessary in the elemental mix for the described heat treatment. Attempts to produce superconducting wire configurations utilizing $Nb_3Sn$ powders and no tin excess have, however, been unrewarding. It is clear that excess tin is necessary in this instance for improving sintering. A 10 weight percent excess, as used in Example 1 and others, is about optimum, with a range indicated at from about 1 percent to about 20 percent and a preferred range from 5 percent to 15 percent. Although exceeding the 20 percent maximum can only improve sintering, it also results in dilution of the superconducting compound and so is considered undesirable. In this connection note that particular desiderata may indicate other additions to the compositions. For example, small additions of niobium may be made to increase critical temperature. Other additions may be made for other purposes as, for example, with a view to physical properties.

The invention has necessarily been described in terms of a limited number of illustrative examples. For simplicity, most work has been carried out utilizing a niobium tube. This material is particularly satisfactory in that it introduces no impurities not already present in the powders, in that it is capable of withstanding the firing conditions, and in that any reaction with the powders, although not considered advantageous can only upset the stoichiometry of the system and so only dilute the system. It is evident, however, that the inventive results are to be attributed, not to the tube material, but rather to the working, preferred ranges for which are set forth above. By reason of apparatus limitations, most measurements have been made on samples of small cross section. Sufficient work is reported, however, to indicate that optimum results are not premised on any particular final dimensions but only on the degree of working as set forth.

The fabricating techniques of this invention are desirably applied to other brittle superconductors. Although it can not be predicted that the unusual advantage of increased critical current will be obtained, it, nevertheless, offers a satisfactory fabricating technique for such materials generally.

Similarly, although it is expected that initial use of the inventive procedures will be with a view of wound magnet configurations, in which working is followed by forming the desired configuration and finally by heat treatment as outlined, other uses will doubtless follow. Since any superconducting use is limited by the parameters of critical current and critical field, and since these are improved by the inventive procedures, it is expected that these processes will not be limited to the manufacture of magnets. For example, the unusually high current densities permitted by materials produced herein suggest wire power transmitting means with diameters of the order of very small fractions of an inch which can be equalled in ordinary conductors only by use of diameters of the order of feet, and even there with an appreciable power dissipation problem.

What is claimed is:

1. Method for fabricating a superconducting element comprising the steps of filling a hollow metallic member with powdered material comprising powder of a composition selected from the group consisting of (1) $Nb_3Sn$ and (2) niobium and tin, mechanically reducing the said member together with contents at least 60 percent and heating at a temperature of from about 500° C. up to about 1500° C. and for a time of from about two hours up to about fifty hours sufficient to produce a continuous superconducting current path of $Nb_3Sn$ along the length of the said member.

2. Method in accordance with claim 1 in which the said member together with contents is reduced by about 99 percent.

3. Method in accordance with claim 1 in which the said powdered material comprises $Nb_3Sn$ powder.

4. Method in accordance with claim 3 in which the said powdered material comprises $Nb_3Sn$ plus elemental tin.

5. Method in accordance with claim 4 in which the amount of elemental tin is in the range of from 1 percent to 20 percent by weight of the amount of $Nb_3Sn$.

6. Method in accordance with claim 5 in which the amount of elemental tin is in the range of from 5 percent to 15 percent by weight of the amount of $Nb_3Sn$.

7. Method in accordance with claim 6 in which the amount of elemental tin is approximately 10 percent by weight of the amount of $Nb_3Sn$.

8. Method in accordance with claim 1 in which the said powdered material comprises powders of tin and niobium.

9. Method in accordance with claim 8 in which the said amounts are approximately stoichiometric in accordance with the formula $Nb_3Sn$.

10. Method in accordance with claim 1 in which heating is carried out at a temperature in the range of from 800° C. to 1500° C. for a time of from 2 to 50 hours.

11. Method in accordance with claim 1 in which heating is carried out at a temperature in the range of from 800° C. to 1200° C. for a time of from 5 to 25 hours.

12. Method in accordance with claim 1 in which heating is caried out at a temperature in the range of from 900° C. to 1000° C. for a time of from 12 to 20 hours and in which the said member is a niobium tube.

13. Method of claim 12 in which the powdered material consists essentially of niobium and tin.

14. Method of claim 12 in which the powdered material consists essentially of $Nb_3Sn$ plus tin.

15. Article produced by the method of claim 13.

16. Article produced by the method of claim 14.

17. Method of fabricating a superconducting element comprising at least one turn of wire comprising the steps of mechanically reducing a hollow metallic member containing a compacted powder mix, the said mix comprising powders of a composition selected from the group consisting of (1) $Nb_3Sn$ plus tin and (2) niobium and tin at least 60 percent, forming the desired configuration, and heating the mechanically reduced member together with contents at a temperature of from about 800° C. up to about 1500° C. and for a time of from about two hours up to about fifty hours sufficient to produce a continuous superconducting current path along the length of the said tube.

18. A superconducting configuration as produced by the method of claim 17.

References Cited in the file of this patent

UNITED STATES PATENTS

| | | |
|---|---|---|
| 2,888,740 | Danis | June 2, 1959 |
| 2,977,399 | Johnston et al. | Mar. 28, 1961 |
| 2,979,399 | Angier | Apr. 11, 1961 |

OTHER REFERENCES

Jones: "Fundamental Principles of Powder Metallurgy," pp. 819–821 (1960).